Dec. 19, 1961  J. F. MORSE  3,013,443
PUSH-PULL CABLE CASING
Filed Sept. 25, 1959  2 Sheets-Sheet 2
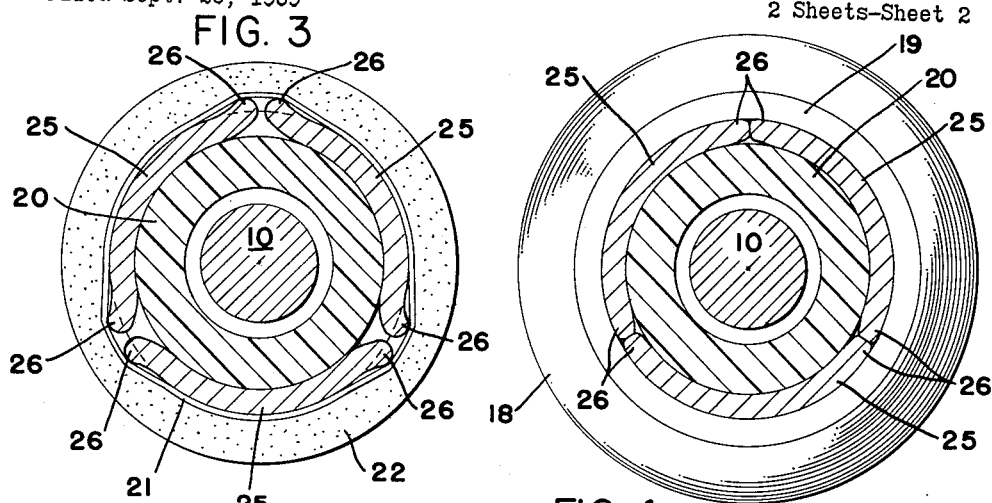
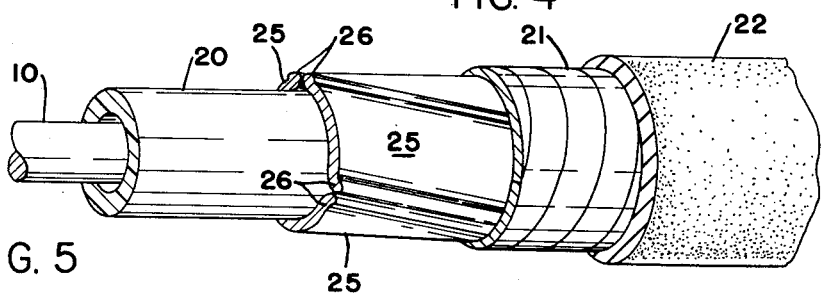
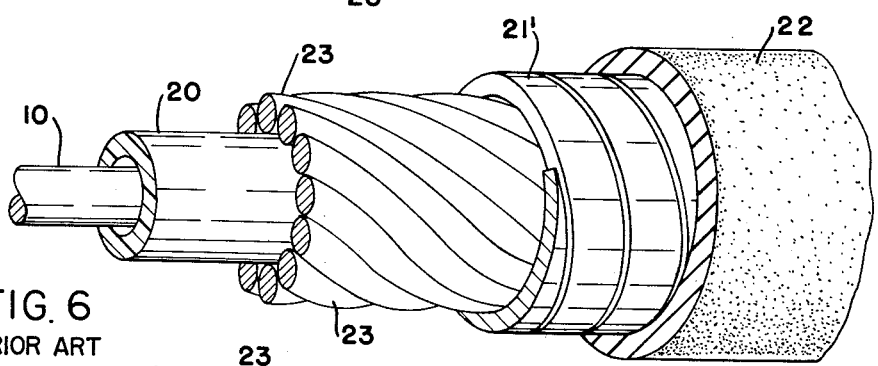
FIG. 6
PRIOR ART
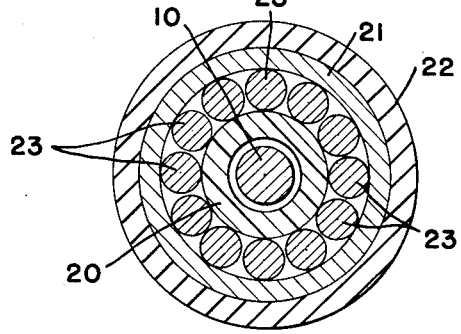
FIG. 7
PRIOR ART
INVENTOR.
JOHN F. MORSE
BY Ely, Frye & Hamilton
ATTORNEYS

United States Patent Office 3,013,443
Patented Dec. 19, 1961

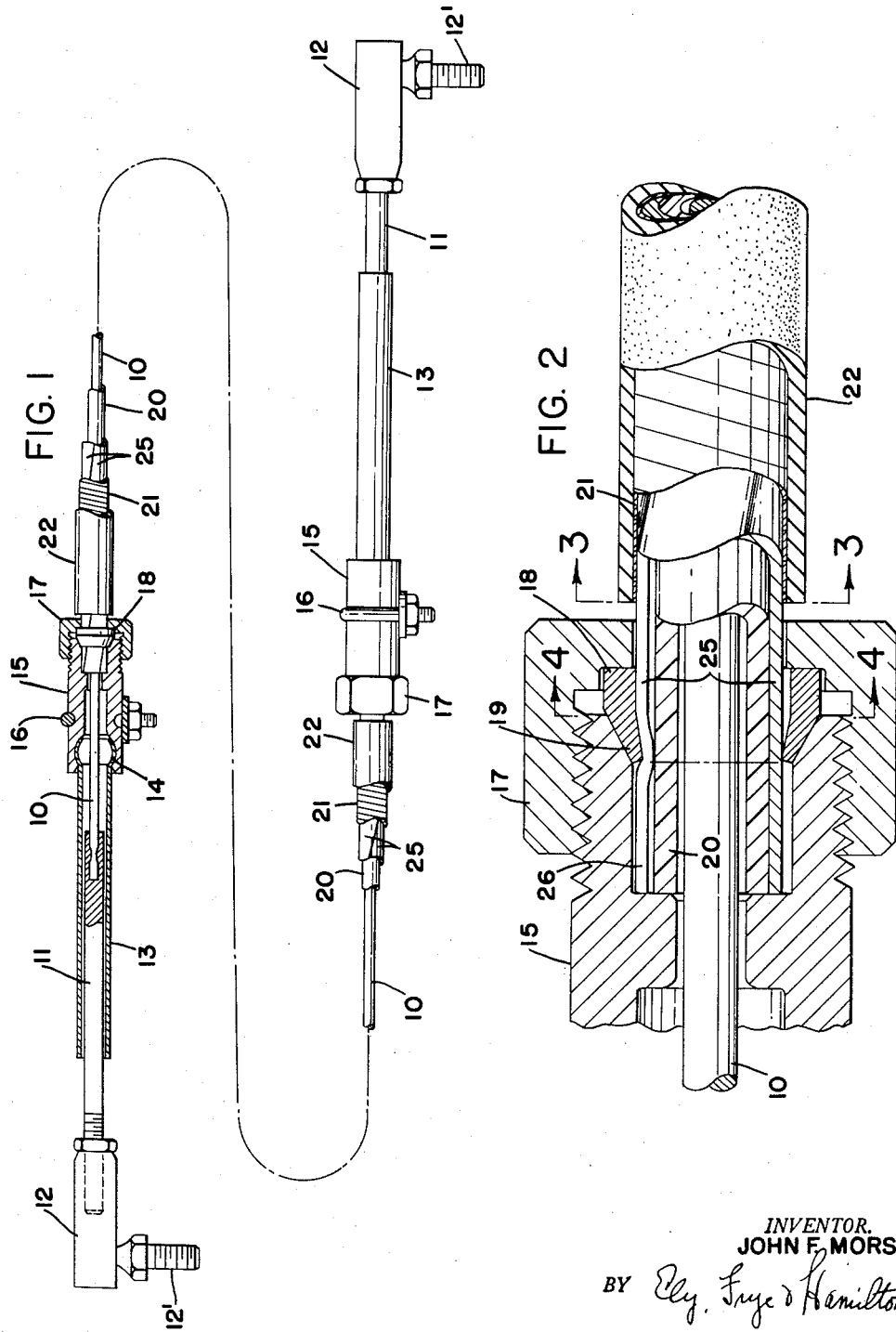

3,013,443
PUSH-PULL CABLE CASING
John F. Morse, 21 Clinton St., Hudson, Ohio
Filed Sept. 25, 1959, Ser. No. 842,368
10 Claims. (Cl. 74—501)

The invention relates to push-pull cables having a flexible core slidable in an outer flexible casing for transmitting mechanical motion in either direction when the outer casing is clamped in position. More particularly, the invention relates to an improved casing construction.

In conventional push-pull cables the casing comprises circumferentially arranged reinforcing round wires wrapped spirally around a flexible plastic tube which acts as a bearing for the inner core, and a flat ribbon is wrapped spirally around the spiral wires to prevent them from bulging outwardly under a compression load. The plastic tube restrains the spiral wires from bulging inwardly under tension, so that the casing assembly is substantially non-resilient longitudinally in tension and compression.

In push-pull cable installations the ends of the casing are clamped in position by end fittings which are either swaged onto the spirally wound wire casing or clamped thereon by a compression nut assembly. A large number of relatively small diameter round wires is desirable to keep the overall diameter of the casing at a minimum, but the smaller the wires the more difficult it is to maintain all of the wires in a circular arrangement because one or a few of the wires tend to snap out of the circle, destroying the tight compression circle required for proper clamping and indenting the inner plastic tube to cause friction between it and the movable core. As a consequence, it is common practice to use large diameter round wires than would otherwise be needed, thereby greatly increasing the cost and weight of the casing.

A further disadvantage of the spiral wire casing is that while the wires should be in contact all around the circle to resist radial compression when clamped and avoid indenting the inner plastic tube, manufacturing tolerances inevitably result in a substantial aggregate clearance between the wires, allowing them to move radially inward until they contact, which usually results in indenting the plastic tube.

The principal object of the present invention is to provide a novel and improved cable casing which overcomes all of the foregoing disadvantages.

Other objects include the provision of a cable casing the elements of which are always maintained in a circular arrangement without indenting the inner plastic tube in which the core slides, and which is inexpensive to manufacture and has a minimum diameter and weight.

The present invention provides an improved cable casing composed of spirally arranged ribbon-like elements having arcuate surfaces conforming to the circumference of the inner plastic tube and having adjoining outturned lips along their edges. The lips are adapted to be bent inwardly by clamping means which applies an inwardly compressive force to the casing, causing the lips to abut each other at their edges and providing a compressively preloaded cylinder which resists further compression by the clamping means and prevents any indentation of the inner plastic tube.

A preferred embodiment of the invention is shown by way of example in the accompanying drawings, and described in detail in the following specification. Various modifications and changes in details of construction are comprehended within the scope of the appended claims.

In the drawings:
FIG. 1 is a schematic view, partly in section, of a typical push-pull cable installation embodying the invention.

FIG. 2 is an enlarged fragmentary sectional view showing the manner of clamping one end of the casing in an end fitting.

FIG. 3 is a cross sectional view on line 3—3 of FIG. 2.
FIG. 4 is a cross sectional view on line 4—4 of FIG. 2.
FIG. 5 is a fragmentary perspective view of the cable with the casing layers progressively broken away.
FIG. 6 is a view similar to FIG. 5 of a conventional cable.
FIG. 7 is a cross sectional view of the cable of FIG. 6.

Referring to FIG. 1, at each end of the cable assembly the core 10 is connected, preferably by swaging, into one end of a push rod 11 which is usually threaded at its outer end for attachment to a fitting such as the swivel connector 12 which attaches to a lever arm or other motion transmitting device by means of a screw 12'. Each rod 11 telescopes into a sleeve guide 13 which has its end swiveled at 14 in an end fitting 15, so that the push rod can swing as it slides in the sleeve.

The end fittings 15 each have an axial bore and are fixedly mounted on a suitable support as by clamps 16, and the ends of the cable casing are anchored in said end fittings so that if a compression load is applied through the push rods to the core to slide it in the casing, a tension load is applied to the casing. If a tension load is applied to the core, a compression load results in the casing between the end fittings.

As best shown in FIG. 2, the ends of the cable casing are secured in the bores of fittings 15 by suitable means such as a compression nut 17 screwed on the fitting 15 and bearing against a wedging or compression ring 18 which engages the cable casing. The ring 18 has a tapered annular flange 19 which is radially contractible, and an interengaging tapered surface on the end of the fitting 15 forces the flange to contract radially when the nut 17 is drawn up. The means shown in FIG. 2 can be used for clamping conventional cable casings and per se forms no part of the present invention.

Referring to FIGS. 5 and 6, the novel cable casing of FIG. 5 comprises the conventional inner plastic tube 20, which may be of nylon and the like, in which the cable core 10 is loosely slidable, and an outer spirally wrapped ribbon 21 similar to ribbon 21' used in the conventional casing construction of FIG. 6. In both cases, an outer cover 22 of resilient material such as rubber or plastic is usually applied to protect the metal casing elements from corrosion. However, in the improved casing the ribbon 21 and its cover 22 may be somewhat smaller in diameter and lighter in weight for reasons which will appear.

According to the present improved casing, the round wires 23 wrapped spirally around the tube 20 in the conventional construction of FIG. 6 are replaced by a plurality of pre-formed metal ribbons 25 which are wrapped around the tube 20 on a long spiral or helix, preferably of shallow pitch, and the ribbons 25 are held in place by the outer ribbon 21 wrapped in a relatively short or steep spiral around all of the ribbons 25. Preferably, three ribbons 25 of equal width are used, although the number may be varied, and, as shown in FIG. 3, their edges are turned radially outward to form lips 26 spaced apart a slight distance on the order of .001 inch to .005 inch, so that the ribbons can be made with normal manufacturing tolerances. Each pair of adjoining lips is oppositely curved on radii such that when a radially inward compressive force is applied to the lips they will abut, as shown in FIG. 4, and transmit a compressive force circularly through the three ribbons. The inner surfaces of the ribbons 25 are arcuate and conform to the outer cylindrical surface of the plastic tube 20. At the plane where the radially inward compressive force is applied (as by the annular flange 19 of ring 18), the three ribbons 25 become a preloaded cylinder which resists further compression and prevents any indentation of the inner plastic tube.

As indicated in FIG. 2, each pair of adjoining lips 26 is indented inwardly by the compression ring flange 19, providing three circumferentially spaced points of definite notching engagement between the ring and the casing to resist pulling the casing out of the end fitting. Thus, the casing is positively clamped in the end fittings by applying a relatively light squeezing force.

The three pre-formed ribbons 25 may be spirally wrapped with a ribbon 21 of aluminum and the like, similar to the conventional ribbon 21', but because of the close contoured fit of the ribbons 25 and their shallow or long helical pitch around the plastic tube 20, the outer ribbon 21 may be thinner and smaller in diameter than the similar ribbon 21' in the conventional construction. Other forms of outer wrapping, such as glass thread, may be substituted for the outer wrapping 21, in which case the outer rubber covering holds the thread in place.

The ends of the casing which are secured in the end fittings 15 have the outer covering 21 removed for about an inch in length prior to insertion into the fittings so that the compression ring 18 bears directly on the pre-formed ribbons 25.

The novel casing construction provides for a reduction in outer diameter and weight of the casing, positive clamping of the casing in the end fittings with light squeezing force, and no danger of indenting the inner plastic tube to interfere with the sliding engagement of the inner core therein. The ribbons 25 may be economically pre-formed to conform with the inner plastic tube with a slight clearance between their lips. Thus there is no problem as in the prior art of circumferentially fitting a plurality of round wires around the tube under such close tolerances as to prevent one or more of the wires from bulging outwardly, or indenting the tube when an outer clamping force is compressively applied to the wires.

What is claimed is:

1. In a push-pull cable casing for an axially slidable cable core, a flexible inner tube in which the cable core is axially slidable, a reinforcing outer covering comprising a plurality of pre-formed metal ribbons spirally wrapped around said tube, the adjoining edges of said ribbons being normally turned radially outward to form lips, the inner surfaces of said ribbons between said lips conforming to the outer surface of said tube, said lips adapted when subjected to a radially inward compressive force to abut each other and cause said ribbons to form a pre-loaded cylinder which resists further inward movement of said ribbons.

2. In combination, a push-pull cable casing having a flexible inner tube, a cable core axially slidable in said tube, a reinforcing outer covering comprising a plurality of pre-formed metal ribbons spirally wrapped around said tube, the adjoining edges of said ribbons being normally turned radially outward to form lips, the inner surfaces of said ribbons between said lips conforming to the outer surface of said tube, and clamping means for circumferentially applying a radially inward compressive force to said lips to bend adjoining lips inwardly into abutment under circumferential compression.

3. In a push-pull cable casing for an axially slidable cable core, a flexible cylindrical inner tube in which the cable core is axially slidable, a reinforcing outer covering comprising a plurality of pre-formed metal ribbons helically wrapped around said tube, the adjoining edges of said ribbons being normally turned outward to form lips, said ribbons being cylindrical between said lips and conforming to the outer surface of said tube, said adjoining lips being oppositely curved on radii such that an inward compressive force will cause the lips to bend inwardly into abutment in circumferential continuation of said ribbons to form a cylinder compressively pre-loaded in a circular direction.

4. In combination, a push-pull cable casing having a flexible cylindrical inner tube, a cable core axially slidable in said tube, a reinforcing outer covering comprising a plurality of pre-formed metal ribbons helically wrapped around said tube, the adjoining edges of said ribbons being normally turned outward to form lips, said ribbons being cylindrical between said lips and conforming to the outer surface of said tube, said adjoining lips being oppositely curved on radii such that an inward compressive force will cause the lips to bend inwardly into abutment in circumferential continuation of said ribbons, and clamping means for circumferentially applying a radially inward compressive force to form the ribbons into a cylinder compressively pre-loaded in a circular direction.

5. In a push-pull cable casing for an axially slidable cable core, a flexible inner tube in which the cable core is axially slidable, a reinforcing outer covering comprising a plurality of pre-formed metal ribbons spirally wrapped around said tube, the adjoining edges of said ribbons being normally turned radially outward to form lips, an outer casing around said pre-formed metal ribbons normally to hold them on said inner tube with their lips in adjoining relation, the inner surfaces of said ribbons between said lips conforming to the outer surface of said tube, said lips adapted when subjected to a radially inward compressive force to abut each other and cause said ribbons to form a pre-loaded cylinder which resists further inward movement of said ribbons.

6. In a push-pull cable casing for an axially slidable cable core, a flexible cylindrical inner tube in which the cable core is axially slidable, a reinforcing outer covering comprising a plurality of pre-formed metal ribbons helically wrapped around said tube, the adjoining edges of said ribbons being normally turned outward to form lips, and an outer casing wrapped spirally around said pre-formed metal ribbons normally to hold them in adjacent relation, said ribbons being cylindrical between said lips and conforming to the outer surface of said tube, said adjoining lips being oppositely curved on radii such that an inward compressive force will cause the lips to bend inwardly into abutment in circumferential continuation of said ribbons to form a cylinder compressively pre-loaded in a circular direction.

7. In a push-pull cable casing for an axially slidable cable core, a flexible inner tube in which the cable core is axially slidable, a reinforcing outer covering comprising a plurality of pre-formed metal ribbons spirally wrapped around said tube, the adjoining edges of said ribbons being normally turned radially outward to form spaced-apart lips, the inner surfaces of said ribbons between said lips conforming to the outer surface of said tube, said lips adapted when subjected to a radially inward compressive force to abut each other and cause said ribbons to form a pre-loaded cylinder which resists further inward movement of said ribbons.

8. In combination, a push-pull cable casing having a flexible inner tube, a cable core axially slidable in said tube, a reinforcing outer covering comprising a plurality of pre-formed metal ribbons spirally wrapped around said tube, the adjoining edges of said ribbons being normally turned radially outward to form spaced-apart lips, the inner surfaces of said ribbons between said lips conforming to the outer surface of said tube, and clamping means for circumferentially applying a radially inward compressive force to said lips to bend adjoining lips inwardly into abutment under circumferential compression.

9. In a push-pull cable casing for an axially slidable cable core, a flexible inner tube in which the cable core is axially slidable, a reinforcing outer covering comprising a plurality of pre-formed metal ribbons spirally wrapped around said tube, the pitch of said spirally wrapped ribbons adapted to resist substantial longitudinal stress, the adjoining edges of said ribbons being normally turned radially outward to form lips, the inner surfaces of said ribbons between said lips conforming to the outer surface of said tube, said lips adapted when subjected to a radially inward compressive force to abut each other and cause said ribbons to form a preloaded cylinder which resists further inward movement of said ribbons.

10. In combination, a push-pull cable casing having a flexible inner tube, a cable core axially slidable in said tube, a reinforcing outer covering comprising a plurality of spirally wrapped ribbons so constructed and arranged around said tube to have a pitch providing substantial resistance to longitudinal stress, the adjoining edges of said ribbons being normally turned radially outward to form lips, the inner surfaces of said ribbons between said lips conforming to the outer surface of said tube, and clamping means for circumferentially applying a radially inward compressive force to said lips to bend adjoining lips inwardly into abutment under circumferential compression.

References Cited in the file of this patent

UNITED STATES PATENTS

| | | |
|---|---|---|
| 817,060 | Greenfield | Apr. 3, 1906 |
| 1,951,723 | Burd et al. | Mar. 20, 1934 |
| 2,087,876 | Peterson | July 20, 1937 |
| 2,184,391 | Lowe | Dec. 26, 1939 |
| 2,184,392 | Lowe | Dec. 26, 1939 |

FOREIGN PATENTS

| | | |
|---|---|---|
| 496,568 | Germany | Apr. 28, 1930 |